US008579690B2

(12) United States Patent
Gerrard

(10) Patent No.: US 8,579,690 B2
(45) Date of Patent: Nov. 12, 2013

(54) GAMING DEVICE HAVING A CHANGING MULTIPLE SELECTION SET BONUS SCHEME

(75) Inventor: Peter Gerrard, Manchester (GB)

(73) Assignee: IGT, Las Vegas, NV (US)

(*) Notice: Subject to any disclaimer, the term of this patent is extended or adjusted under 35 U.S.C. 154(b) by 2627 days.

(21) Appl. No.: 10/977,672

(22) Filed: Oct. 28, 2004

(65) Prior Publication Data

US 2005/0059462 A1 Mar. 17, 2005

Related U.S. Application Data

(62) Division of application No. 10/458,445, filed on Jun. 9, 2003, now Pat. No. 6,817,943, which is a division of application No. 09/680,592, filed on Oct. 6, 2000, now Pat. No. 6,602,135.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .......................................................... 463/16

(58) Field of Classification Search
USPC ............................. 463/10, 11, 12, 13, 17, 18
See application file for complete search history.

(56) References Cited

U.S. PATENT DOCUMENTS

| | | | | |
|---|---|---|---|---|
| 4,624,459 A | | 11/1986 | Kaufman | |
| 4,840,382 A | | 6/1989 | Rubin | |
| 5,072,946 A | | 12/1991 | Miller | |
| 5,154,420 A | | 10/1992 | Gutknecht | |
| 5,324,041 A | | 6/1994 | Boylan et al. | |
| 5,524,888 A | | 6/1996 | Heidel | |
| 5,664,999 A | | 9/1997 | Kurihara | |
| 5,851,011 A | * | 12/1998 | Lott | 273/292 |
| 5,918,884 A | * | 7/1999 | DiMuro | 273/292 |
| 5,988,643 A | | 11/1999 | Awada | |
| 6,015,346 A | | 1/2000 | Bennett | |
| 6,033,307 A | | 3/2000 | Vancura | |
| 6,089,976 A | | 7/2000 | Schneider et al. | |

(Continued)

FOREIGN PATENT DOCUMENTS

| | | |
|---|---|---|
| EP | 0 281 402 | 9/1988 |
| EP | 0 945 837 | 9/1999 |

(Continued)

OTHER PUBLICATIONS htttp://gscentral.net/dice.htm, of Aug. 22, 2004, Price is Right Dice Game, downloaded frorn, http://web.archive.org|web1200408220756041 http:||gscentral.net/dice.htm on Aug. 19, 2007.*

(Continued)

*Primary Examiner* — David L Lewis
*Assistant Examiner* — Reginald Renwick
(74) *Attorney, Agent, or Firm* — Neal, Gerber & Eisenberg LLP

(57) ABSTRACT

A gaming device and method having a bonus round, where the bonus round forms a plurality of sets of symbols from a plurality of symbols, and enables the player to predict which set of symbols will include a randomly determined symbol. If the player predicts correctly, the player receives a bonus and the bonus round continues. If the player is wrong, the bonus round terminates.

41 Claims, 12 Drawing Sheets

(56) References Cited

U.S. PATENT DOCUMENTS

| | | | |
|---|---|---|---|
| 6,102,798 | A | 8/2000 | Bennett |
| 6,135,882 | A | 10/2000 | Kadlie |
| 6,142,874 | A | 11/2000 | Kodachi et al. |
| 6,142,875 | A | 11/2000 | Kodachi et al. |
| 6,146,271 | A | 11/2000 | Kadlic |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,168,523 | B1 | 1/2001 | Piechowiak et al. |
| 6,174,235 | B1 | 1/2001 | Walker et al. |
| 6,224,483 | B1 | 5/2001 | Mayeroff |
| 6,231,442 | B1 | 5/2001 | Mayeroff |
| 6,296,568 | B1 | 10/2001 | Tracy |
| 6,305,686 | B1 | 10/2001 | Perrie et al. |
| 6,398,220 | B1 | 6/2002 | Inoue |
| 6,406,369 | B1 * | 6/2002 | Baerlocher et al. ............. 463/20 |
| 6,425,824 | B1 | 7/2002 | Baerlocher |
| 6,439,995 | B1 | 8/2002 | Hughs-Baird et al. |
| 6,511,375 | B1 | 1/2003 | Kaminkow |
| 6,585,591 | B1 | 7/2003 | Baerlocher |
| 6,595,854 | B2 | 7/2003 | Hughs-Baird et al. |
| 6,599,185 | B1 | 7/2003 | Kaminkow |
| 6,634,943 | B1 | 10/2003 | Baerlocher |
| 6,688,977 | B1 | 2/2004 | Baerlocher |
| 6,780,107 | B2 | 8/2004 | Baerlocher et al. |
| 6,802,775 | B2 | 10/2004 | Baerlocher et al. |
| 7,361,087 | B2 | 4/2008 | Baerlocher et al. |
| 2002/0135129 | A1 | 9/2002 | Tarantino |
| 2003/0104852 | A1 * | 6/2003 | Duhamel ........................ 463/13 |
| 2003/0153378 | A1 | 8/2003 | Schlegel et al. |
| 2005/0032565 | A1 | 2/2005 | Cheng et al. |
| 2005/0059448 | A1 | 3/2005 | Sims et al. |
| 2006/0025191 | A1 * | 2/2006 | Snow et al. ..................... 463/13 |

FOREIGN PATENT DOCUMENTS

| | | |
|---|---|---|
| GB | 2105891 | 3/1983 |
| GB | 2 222 712 | 3/1990 |
| GB | 2 262 642 A | 6/1993 |
| WO | WO 82/01611 | 5/1982 |
| WO | WO 98/60207 | 1/1998 |
| WO | WO 00/12186 | 3/2000 |

OTHER PUBLICATIONS

Double Up Poker Game Description written by IGT, available prior to 2000.

Roulette Description, Gaming Guide Peppermill Hotel, available prior to 2000.

Run for Your Money Brochure, IGT, 1998.

In Between Game Description IGT, available prior to 2000.

* cited by examiner

GAMING DEVICE HAVING A CHANGING MULTIPLE SELECTION SET BONUS SCHEME

PRIORITY CLAIM

This application is a divisional of and claims the benefit of U.S. patent application Ser. No. 10/458,445, filed Jun. 9, 2003, now U.S. Pat. No. 6,817,943 which is a divisional of and claims the benefit of U.S. patent application Ser. No. 09/680,592, filed Oct. 6, 2000, now U.S. Pat. No. 6,602,135, the entire contents of which are incorporated herein.

CROSS-REFERENCE TO RELATED APPLICATIONS

This application is related to the following commonly-owned co-pending patent applications: "GAMING DEVICE HAVING A BONUS SCHEME INCLUDING A PLURALITY OF SELECTION GROUPS WITH WIN-GROUP OUTCOMES," Ser. No. 09/981,084; "GAMING DEVICE HAVING A BONUS SCHEME WITH MULTIPLE SELECTION GROUPS," Ser. No. 10/243,047; "GAMING DEVICE HAVING A BONUS ROUND WITH A WIN, LOSE OR DRAW OUTCOME," Ser. No. 10/163,805; "GAMING DEVICE HAVING A MULTIPLE SELECTION GROUP BONUS ROUND," Ser. No. 10/327,538; "GAMING DEVICE HAVING A MULTIPLE SELECTION AND AWARD DISTRIBUTION BONUS SCHEME," Ser. No. 10/459,809; "GAMING DEVICE HAVING A MULTIPLE SELECTION AND AWARD DISTRIBUTION BONUS SCHEME," Ser. No. 10/452,304; "GAMING DEVICE HAVING A BONUS SCHEME WITH MULTIPLE SELECTION GROUPS," Ser. No. 10/623,421; "GAMING DEVICE HAVING RELATED MULTI-GAME BONUS SCHEME," Ser. No. 10/662,496; "GAMING DEVICE HAVING "GAMING DEVICE HAVING RELATED MULTI-GAME BONUS SCHEME," Ser. No. 10/662,929; "GAMING DEVICE WITH PRIZE BONUS SCHEME HAVING MULTIPLE AWARD LEVELS," Ser. No. 10/763,430; "GAMING DEVICE HAVING AN ELEMENT AND ELEMENT GROUP SELECTION AND ELIMINATION BONUS SCHEME," Ser. No. 10/909,806; and "GAMING DEVICE HAVING AN ELEMENT AND ELEMENT GROUP SELECTION AND ELIMINATION BONUS SCHEME," Ser. No. 10/958,823.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device having a changing multiple selection set bonus scheme, and more particularly to a gaming device wherein a player predicts which one of a plurality of multiple selection sets includes a randomly determined selection.

BACKGROUND OF THE INVENTION

Gaming machines such as slot machines currently provide bonus schemes wherein a player has one or more opportunities to select one or more symbols from a plurality of possible symbols. If the player selects one of the designated winning or symbols or a winning combination of symbols, the game awards the player a credit or bonus value. The outcome depends upon the particular symbol or symbols obtained by the player. If the player selects a terminating symbol, the game terminates. Other various bonus games have been associated with gaming machines. To increase player enjoyment and excitement, it is desirable to provide new bonus games for gaming devices.

SUMMARY OF THE INVENTION

The present invention provides a gaming device having a bonus scheme in which the player predicts whether a selection randomly determined by the gaming device will be in one of a plurality of selection sets. The selection sets preferably change after each determination. The player obtains a bonus award for each correct prediction. If the player is incorrect, the bonus round terminates. If the player is correct, a predetermined number of times without being incorrect, the player wins a relatively large bonus award.

One preferred embodiment of the present invention provides a gaming scheme wherein the player is asked to predict if a number determined by the gaming device will be in a first or high selection set or a second or low selection set. The high and low selection sets are determined based on a number previously determined by the gaming device. If the player selects correctly, the player is awarded credits. If the player is incorrect, the bonus round preferably terminates. This embodiment preferably includes three display areas. The display areas include a first or select number display, a second or match number display and a credit display area. Two selection buttons or indicators are also provided to enable the player to select the high selection set or low selection set.

In this preferred embodiment, the game uses numbers 1 through 12 to form the high and low selection sets. Preferably, either a 12 or a 1 used as the first select number, where the probability that either a 12 or a 1 is selected is equal (i.e., the player has a fifty percent chance that the game will display a 12 as the select number and a fifty percent chance that the game will display a 1 as the select number). This arrangement guarantees that the player will receive a bonus or credits on the first play of the bonus round because there are no selections or numbers in a high selection set and numbers 1 to 11 are in the low selection set. The gaming device displays or exhibits the select number in the select number display.

The object of the game for the player is to predict whether the match number will be in the first or second selection sets. In this embodiment, the numbers in the first selection set are higher than the select number currently displayed and the numbers in the second selection set are lower than the select number currently displayed. The player makes a prediction, registering or inputting their prediction using select buttons. The gaming device randomly determines the match number and whether the match number is in the higher or first selection set. If the match number is higher than the select number, the gaming device determines whether the player made the correct prediction. If the player made the correct prediction, the gaming device awards a bonus or credit to the player. Preferably, the game then uses the match number as the select number for the next determination and repeats the process until the player makes an incorrect selection or makes a predetermined number of correct selections. The first or high selection set and the second or low selection set change based on the new select number. In this example, the high selection set includes all of the numbers above the new select (i.e., to 12) and the low selection set includes all of the numbers below the new select number (i.e., to 1). Preferably, the match number cannot be the same as the select number and therefore, the select number is not in either selection set. Accordingly, after each determination, the selection sets change. If the player did not make the correct prediction, the bonus round terminates. It should be appreciated that the numbers in the selection sets could vary and the selection sets could include suitable symbols or objects.

It is therefore an object of the present invention to provide a gaming device having a changing multiple selection set bonus scheme.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
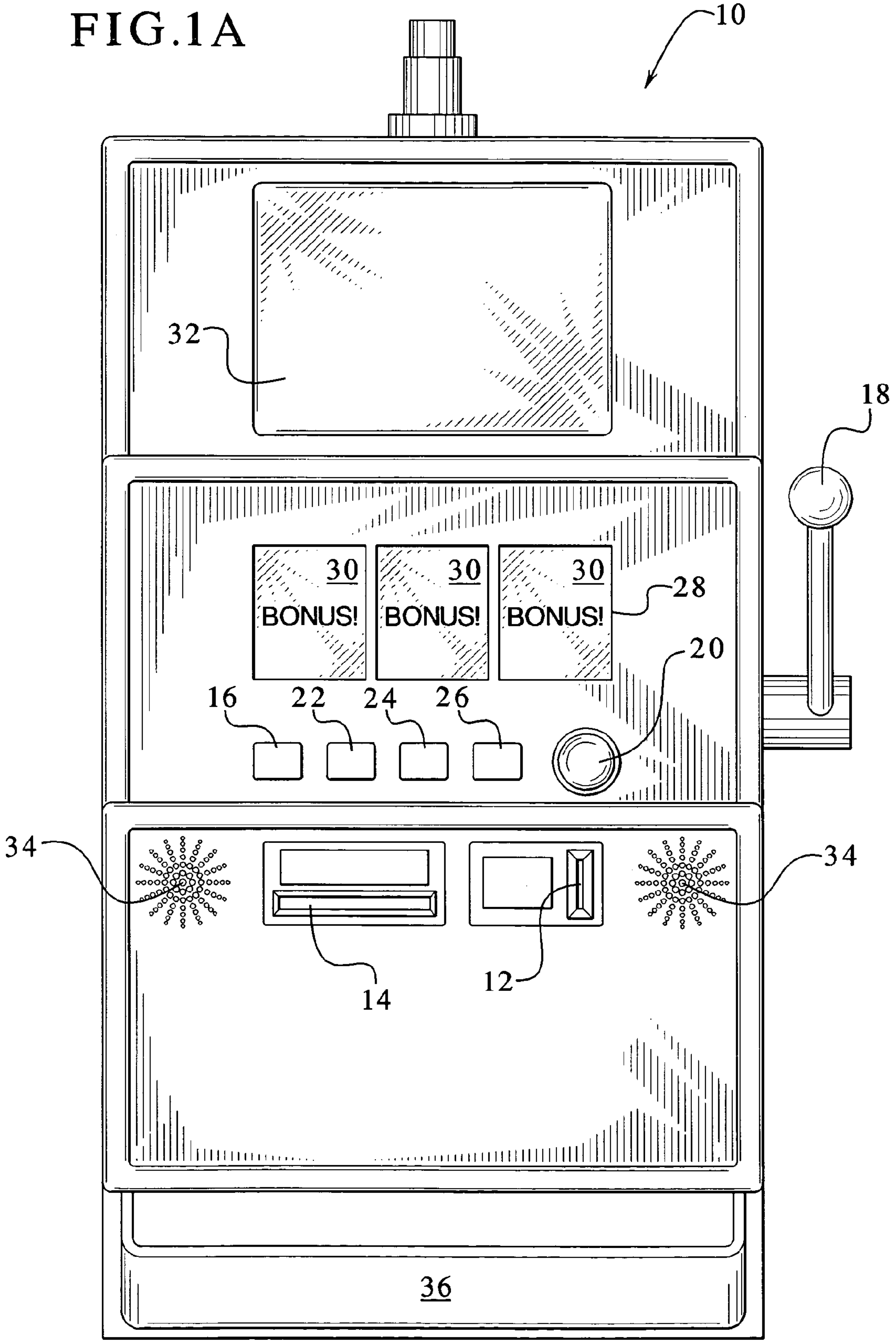
FIGS. 1A and 1B are front plan views of alternative embodiments of the gaming device of the present invention.
Figure 1B:
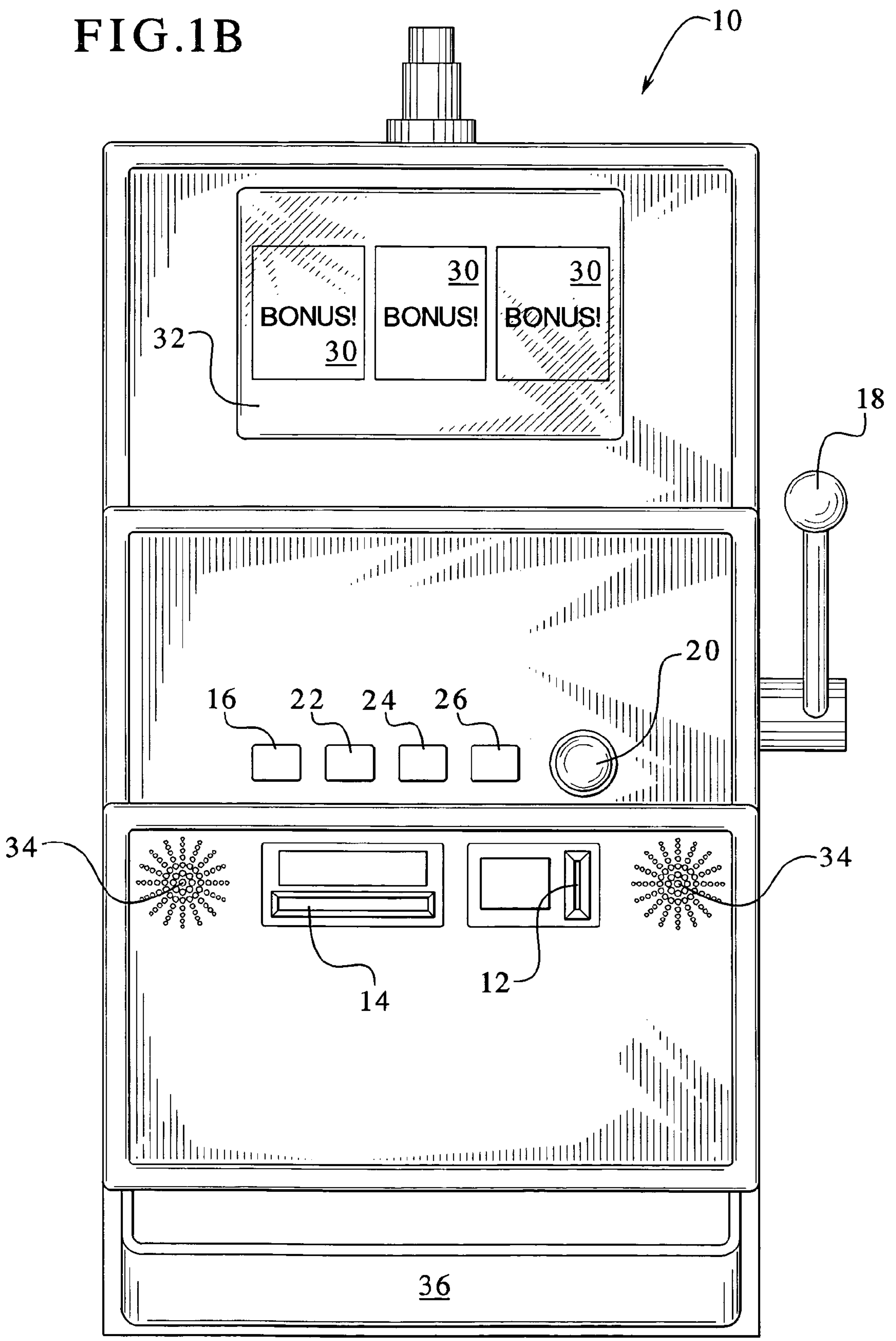

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket voucher in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
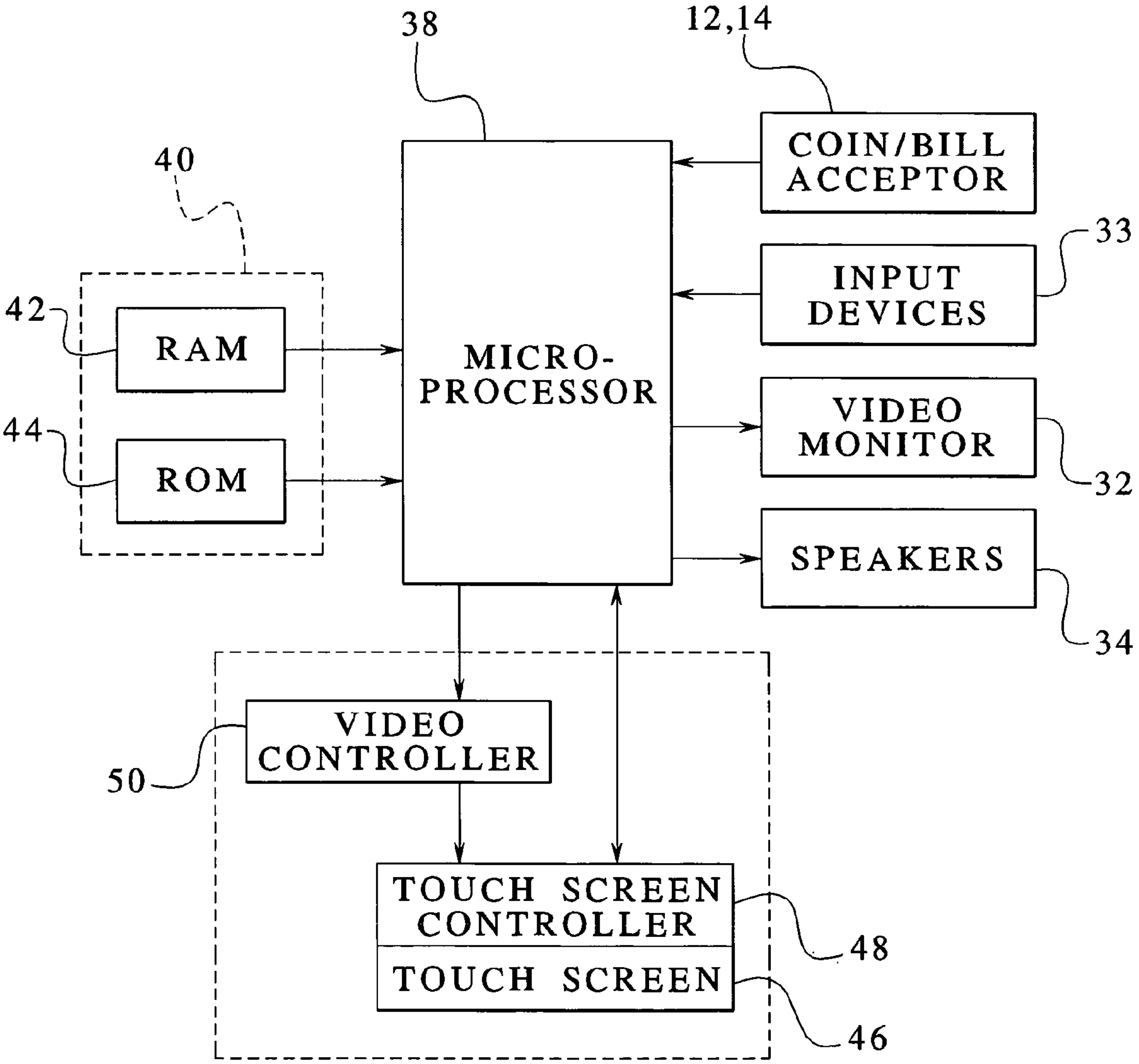
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Scheme

If a player achieves a bonus triggering or qualifying condition during the primary game, the gaming device 10 automatically initiates the bonus round of the present invention.

Figure 3A:
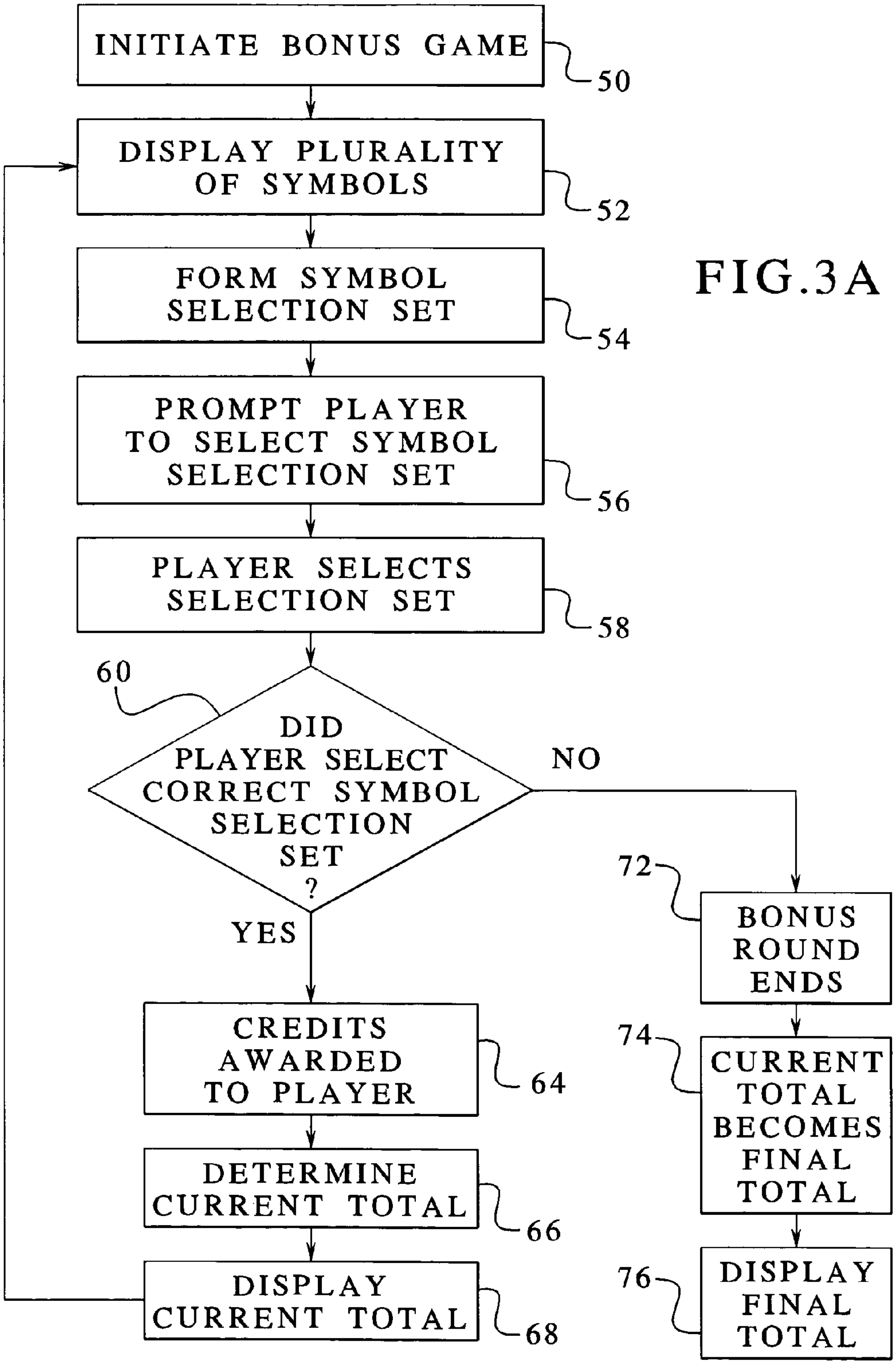
FIGS. 3A and 3B are flow diagrams of alternative embodiments of the bonus scheme of the present invention described using the high and low selection sets.

One embodiment of the bonus round of the present invention initiates the bonus game in accordance with the gaming scheme as indicated by block 50 in FIG. 3A. The object of the gaming scheme of the present invention is to determine if a symbol selected by the gaming device 10 from a plurality of symbols is contained in a first symbol selection set or second symbol selection set formed from the plurality of symbols. If the player predicts correctly, the player is awarded bonus values or credits. If the player is incorrect, the bonus round preferably terminates.

One embodiment includes three display areas or boxes provided by display 32. The display areas include a first display, a second display, and a current credit display. Two select buttons are also provided, whereby the player enters the prediction.

The game selects and displays a plurality of symbols as indicated by block 52. In one embodiment, the game displays a plurality of numbers ranging from 1 to 12 as discussed in detail below. While numbers are discussed, it should be appreciated that any symbols are contemplated, such as letters A-Z, signs of the Zodiac, months of the year, characters, city names, state names, etc. It is preferred but not necessary that the symbols are arranged in some predetermined or logical order, i.e., numerically, alphabetically, by color, by shape, etc.

The game forms at least one symbol selection set as indicated by block 54. The game selects one symbol from the plurality of symbols (i.e., the select symbol) and displays it in the first display. The remaining, unselected, symbols then form one, two or more symbol selection sets. The game selects a second symbol from the plurality of symbols other than the select symbol (i.e., the match symbol) which is not displayed until the player makes a prediction. The player must predict the symbol selection set containing the match symbol to win each play of the bonus game.

In one embodiment, the game selects the first or last symbol of the plurality of symbols, either alphabetically or numerically, and displays that symbol as the select symbol. The remaining symbols then comprise one symbol selection set. The game selects the match symbol from the plurality of symbols (other than the select symbol) which are not displayed. The player then predicts which symbol selection set contains the match symbol. Since all the other symbols are in one symbol selection set, this selection set is obvious and guarantees a player will win.

In the next play of the bonus game, the gaming device selects a new select symbol. Preferably, the match symbol from the previous play becomes the select symbol for the current game or round. However, it is anticipated that gaming device 10 can select any symbol as the select symbol. In this embodiment, the gaming device forms at least two symbol selection sets. To win, the player must predict the symbol selection set containing the match symbol (i.e., the match symbol set). This bonus game continues until terminated (i.e., the player selects the incorrect select set or some terminating symbol). Preferably, the award for each successive correct prediction by the player is larger than the previous award, and if the player matches a predetermined number of correct predictions, the player may win a relatively large bonus award.

Figure 3B:
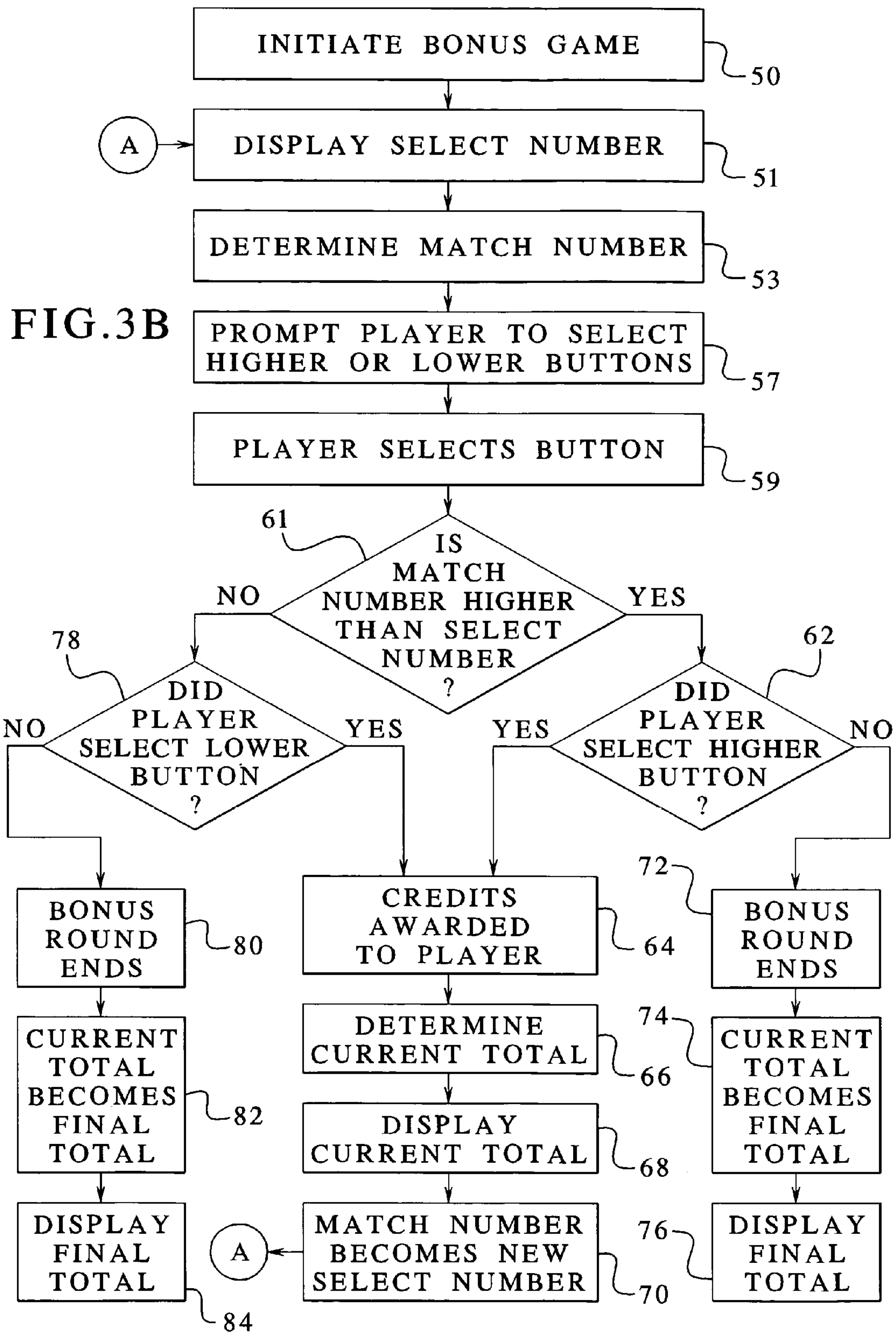

In one preferred embodiment of the bonus scheme, the symbols are numbers. In this embodiment, the object is to predict whether the second or match number is higher or lower than the first or select number currently displayed in the select number display as illustrated in FIG. 3B (i.e., the numbers are grouped in a first or high selection set or in a second or low selection set). The gaming device 10 determines the select and match numbers as indicated by blocks 51 and 53, but does not display the match number until the player makes a selection. The game prompts the player to select the correct selection set using the higher or lower select button or arrow as indicated by block 57.

In the preferred embodiment, the game uses numbers 1 through 12. Preferably, either a 12 or a 1 is selected as the first or select number, where the probability that either a 12 or a 1 is selected is equal (i.e., the player has a fifty percent chance that the game will display a 12 as the select number and a fifty percent chance that the game will display a 1 as the select number). This arrangement maximizes the player's chance of receiving some bonus value or credits on the first play of the bonus round. Gaming device 10 displays or exhibits the select number in the select number display.

The player predicts whether the match number is higher or lower than the select number, pressing either the higher or lower select buttons or arrows to register his choice as indicated by block 59. The gaming device 10 determines whether the match number is higher than the select number as indicated by diamond 61. If the match number is higher than the select number, the gaming device 10 determines whether the player made the correct selection.

In the depicted embodiment, the gaming device 10 determines if the player selected the higher select button as indicated by diamond 62. If the player selected the higher select button, the gaming device awards credit values or bonus points to the player as indicated by block 64. The gaming device 10 determines the player's current total and displays that amount in the score or current total display as indicated by blocks 66 and 68, respectively. The gaming device 10 determines a new select number and the bonus round continues (i.e., the process repeats itself selecting a new select symbol as indicated by block 51 of FIG. 3B) until the player makes an incorrect selection.

In one preferred embodiment of the present invention, the match number becomes the new select number as indicated by block 70. In one alternative embodiment of the present invention, the gaming device 10 may only use a number once. That is once a number is used as the select number, it is not used again.

If the player did not select the higher number, then the bonus round terminates as indicated by block 72. The current total displayed in the current total display becomes the final total as indicated by block 74. The gaming device displays the final total as indicated by block 76 and either terminates the bonus round, returning the player to the primary game, or terminates both the primary and secondary games.

If the match number is not higher than the select number (i.e., the match number is lower than the select number) the gaming device 10 again determines whether the player made the correct prediction. The gaming device 10 determines if the player selected the lower selection button as indicated by diamond 78. If the player selected the lower button, the gaming device awards points to the player, determining the player's current total and displaying that amount in the score or current total display as indicated by blocks 64, 66 and 68 respectively. The new select number is again determined as indicated by block 51 and the process repeats itself as discussed previously.

If the player did not select the lower number, then the bonus round terminates as indicated by block 80. The current total displayed in the current total display becomes the final total and the final total is displayed as indicated by blocks 82 and 84 respectively. Again, the gaming device either terminates the bonus round, returning the player to the primary game, or terminates both the primary and secondary games as discussed previously.

Figure 4A:
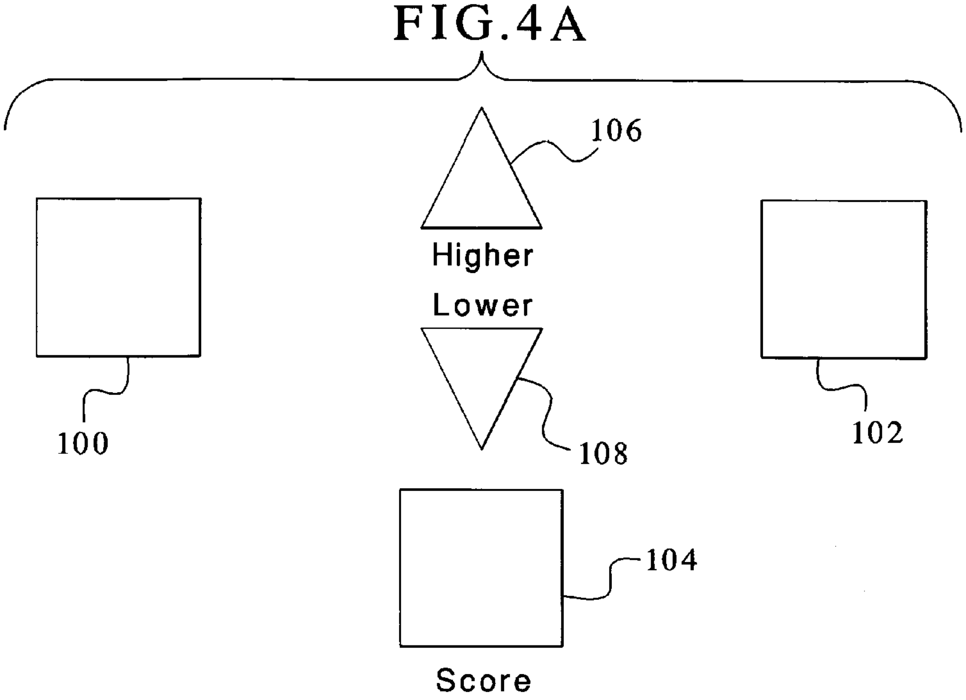
FIGS. 4A, 4B, 4C, 4D, 4E, 4F, 4G and 4H are top plan views of the number, higher and lower arrows and scoring displays in the high and low embodiment of the gaming scheme of the present invention.

One embodiment of the game is illustrated in FIGS. 4A through 4H. The triggering or qualifying event in the primary game triggers the secondary game or bonus round which is provided or displayed by display 32. In this embodiment, preferably three display areas or boxes are provided by display 32. The display areas include a first or select number display 100, a second or match number display 102 and a score or current credit display 104. Two direction select buttons or arrows are also provided, labeled higher and lower select buttons or arrows 106 and 108 respectively, whereby the player selects or predicts whether the match number is higher or lower than the select number as illustrated in FIG. 4A.

Figure 4B:
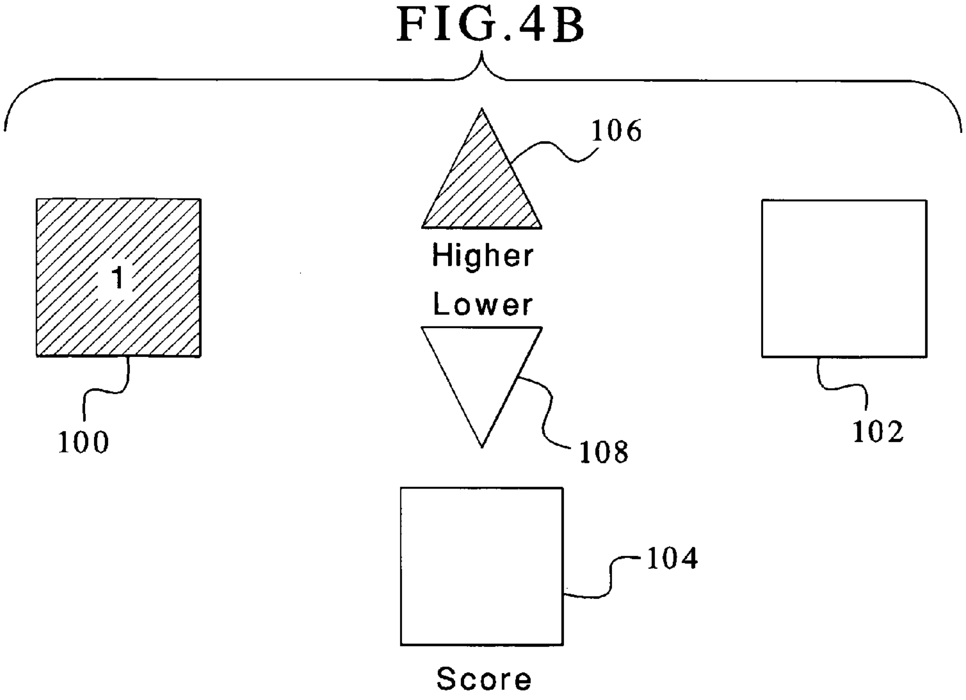

The game selects and displays a number (i.e., the select number) in the select number display 100 as illustrated in FIG. 4B. In one preferred embodiment, the game uses numbers 1 through 12 as discussed previously, where the probability that either a 12 or a 1 is selected is equal. In this embodiment, gaming device 10 displays or exhibits the number 1 as the first or select number in the select number display 100.

The gaming device 10 determines the match number, but does not display that number until the player makes a selection as discussed previously. Preferably, the game prompts the player to select a higher or lower select arrow 106 and 108, respectively. Here, as the first number is 1, the player determines that the second number is higher and pressing the higher select button or arrow 106, registers his decision. Preferably the player uses touch screen 50 to make this selection. Display 32 highlights the higher select button or up arrow 106 as illustrated.

Figure 4C:
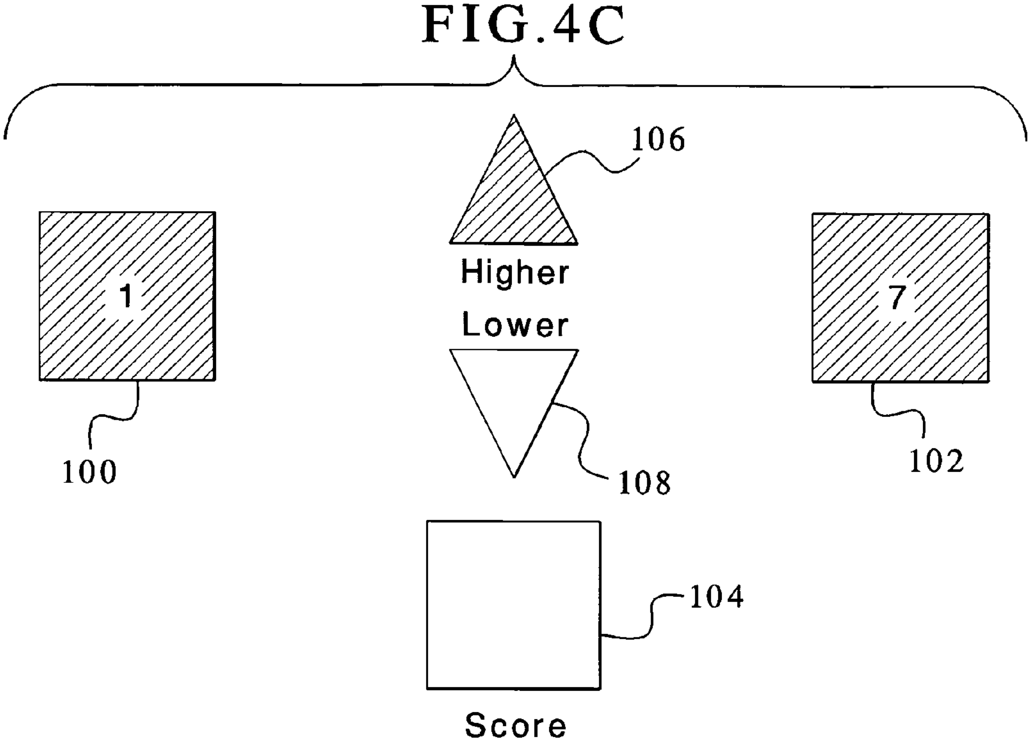
Figure 4D:
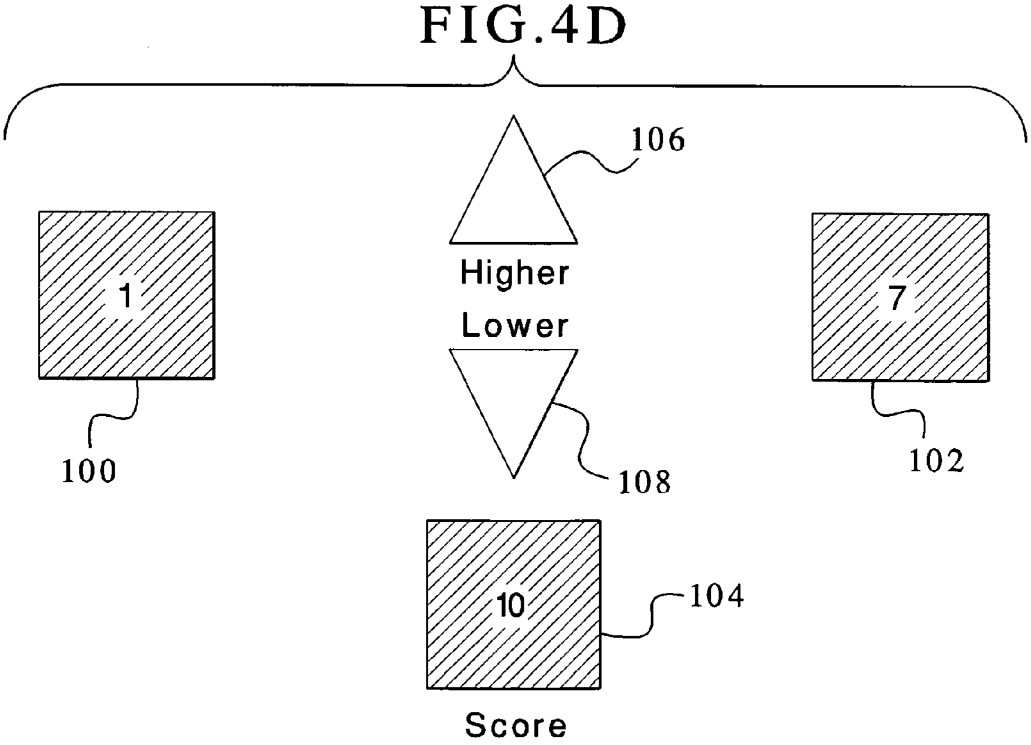

Display 32 displays the second or match number in the match number display 102 as illustrated in FIG. 4C. The gaming device 10 determines whether the displayed second number is higher or greater than the first number. Since 7 is higher or greater than 1, the gaming device 10 determines that the player made the correct selection and awards points, credits or bonus values to the player as illustrated in FIG. 4D. The gaming device 10 determines the player's current total and displays that amount in the score or current credit display 104 as illustrated.

Figure 4E:
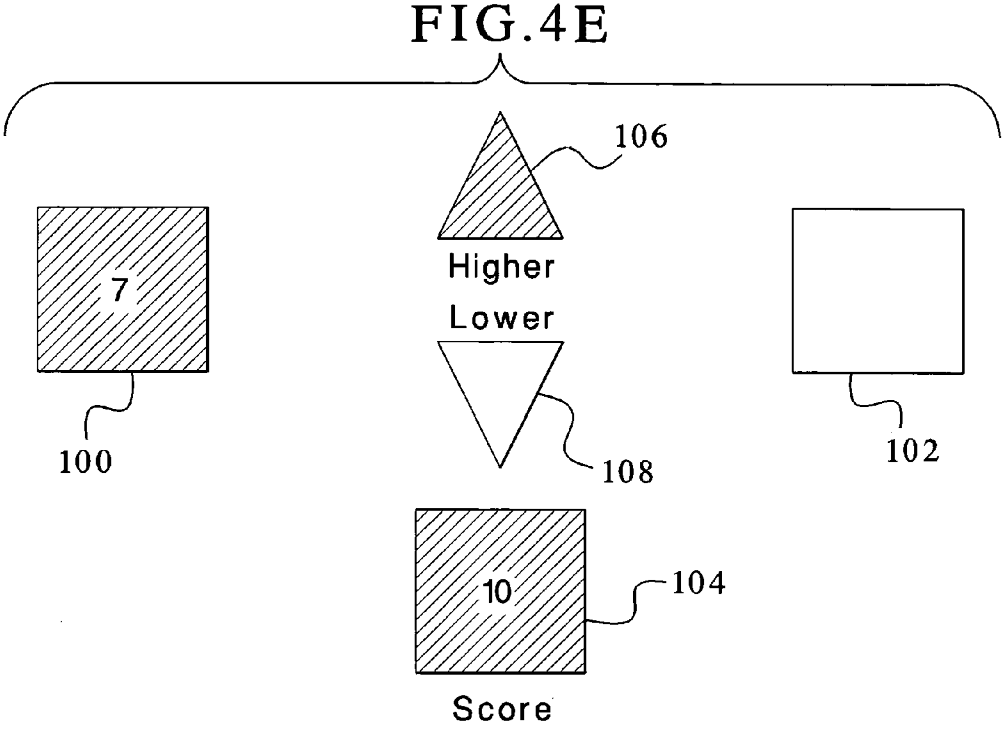
Figure 4F:
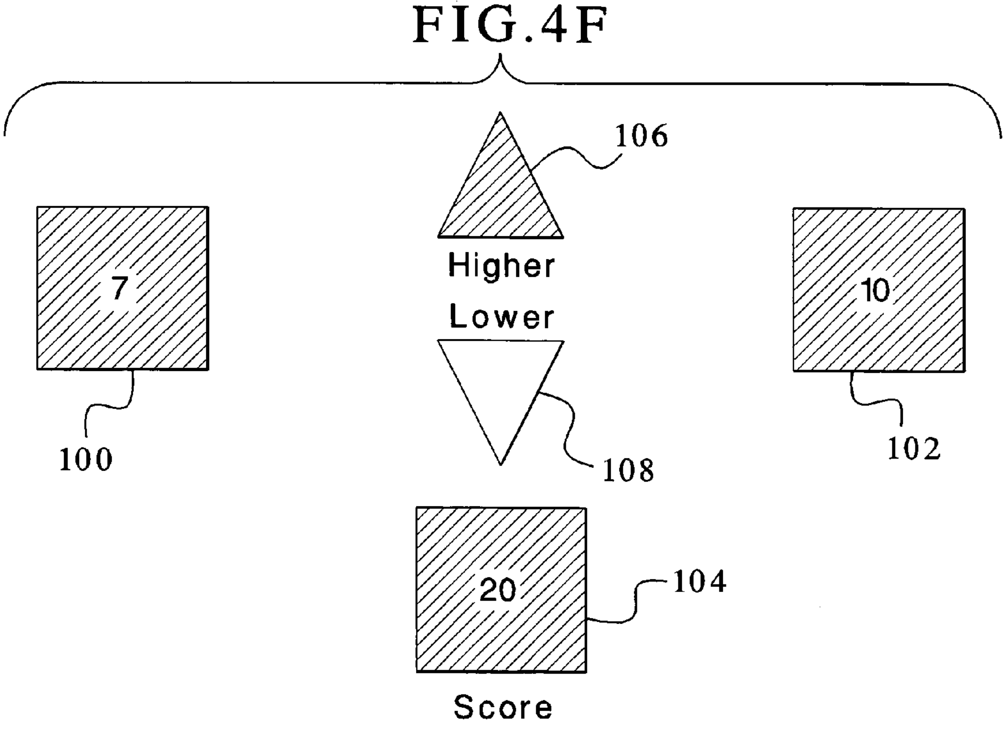

The gaming device 10 repeats the process, determining a new first or select number which is displayed in the select number display 100 as illustrated in FIG. 4E. In one preferred embodiment, the second or match number from the previous play of the bonus round becomes the first or select number of the next play as illustrated. The gaming device 10 randomly selects a new second or match number and prompts the player to determine if that number is higher or lower than the first number. The player makes a selection, here selecting the higher select button or up arrow 106 as illustrated in FIG. 4F. The gaming device then displays the second or match number in the match number display 102 as illustrated. The gaming device 10 again determines whether the displayed second number is higher than the first number. Since 10 is higher or greater than 7, the player wins again and the game awards points, credits or bonus values to the player as illustrated.

Figure 4G:
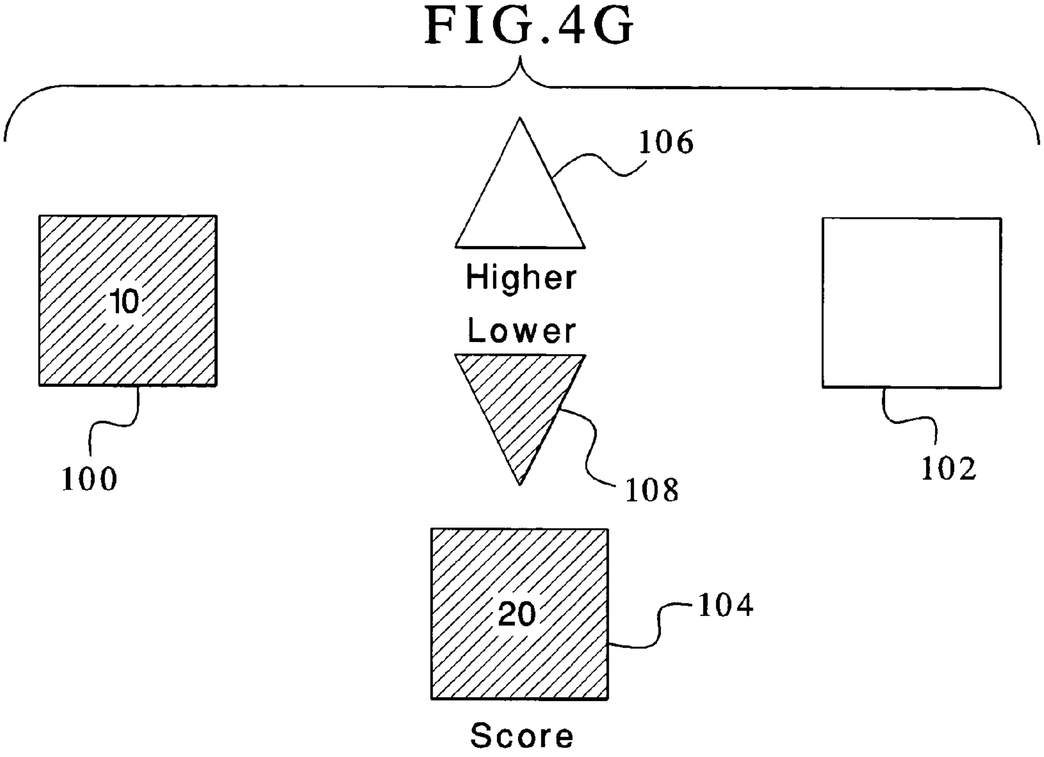
Figure 4H:
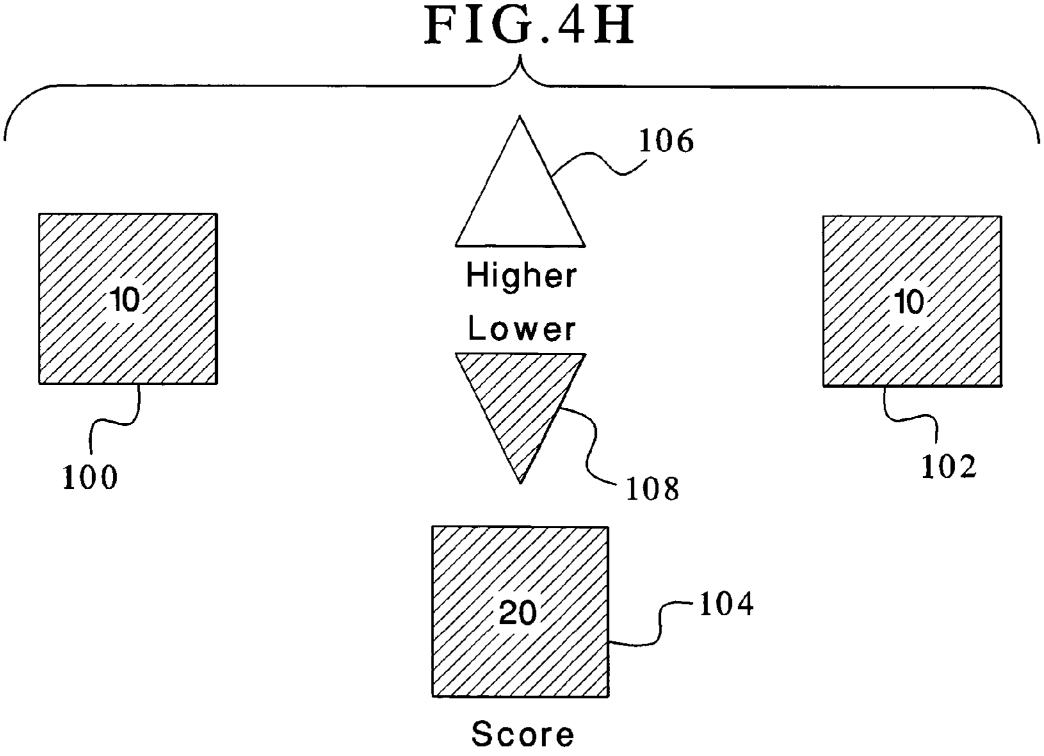

The gaming device 10 repeats the process until the player makes a wrong decision, terminating the bonus round as illustrated in FIGS. 4G and 4H. The first number 10 (the second number from the previous play) is displayed in select number display 100. The gaming device 10 determines the second number and the player determines if the second number is higher or lower than the first number. Here, the player determines that the second number is lower or less than the first number and selects the lower select button or down arrow 108 as illustrated in FIG. 4G. The gaming device 10 displays the second number (12) in the match number display 102 as illustrated in FIG. 4H. Since 12 is higher or greater than 10, the player loses and preferably the bonus game terminates.

If the player did not select the higher number, then preferably the bonus round terminates. The current total displayed in the current total display 104 becomes the final total. The gaming device 10 displays the final total in the current total display 104 and either terminates the bonus round, returning the player to the primary game, or terminates both the primary and secondary games.

Figure 5A:
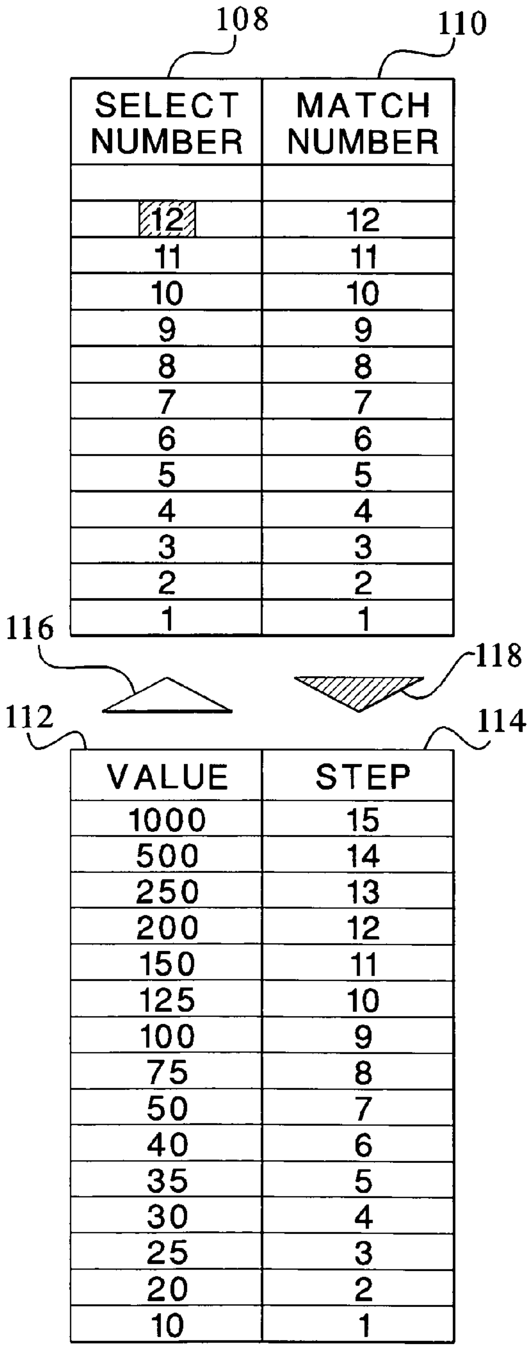
FIGS. 5A, 5B and 5C are top plan views of the number, higher and lower arrows and scoring displays illustrating an alternative embodiment of the gaming scheme of the present invention.
Figure 5B:
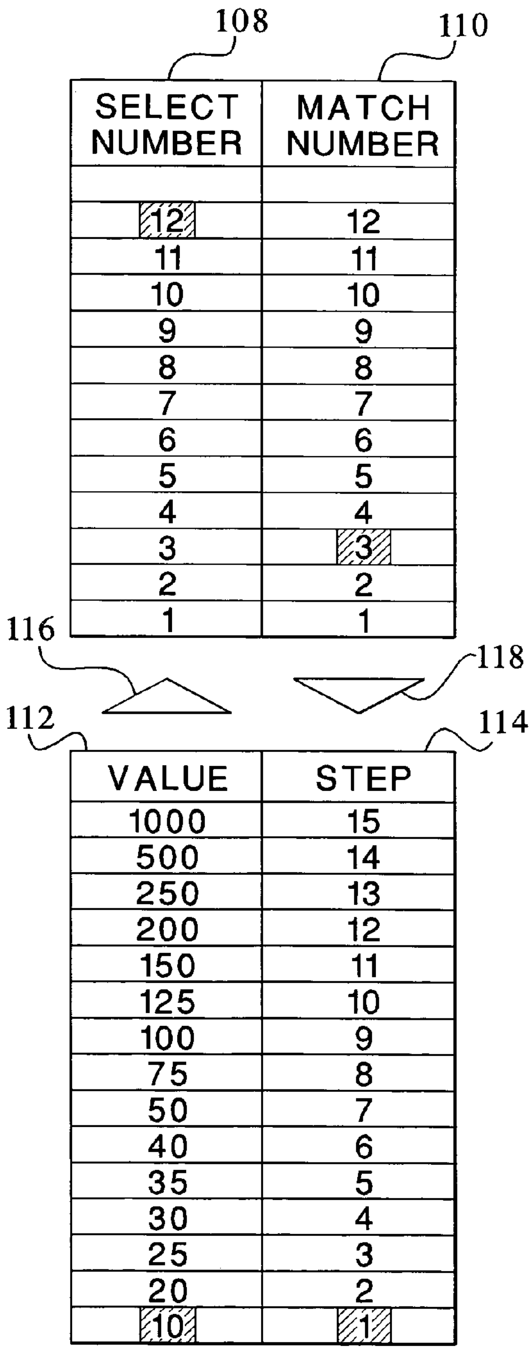
Figure 5C:
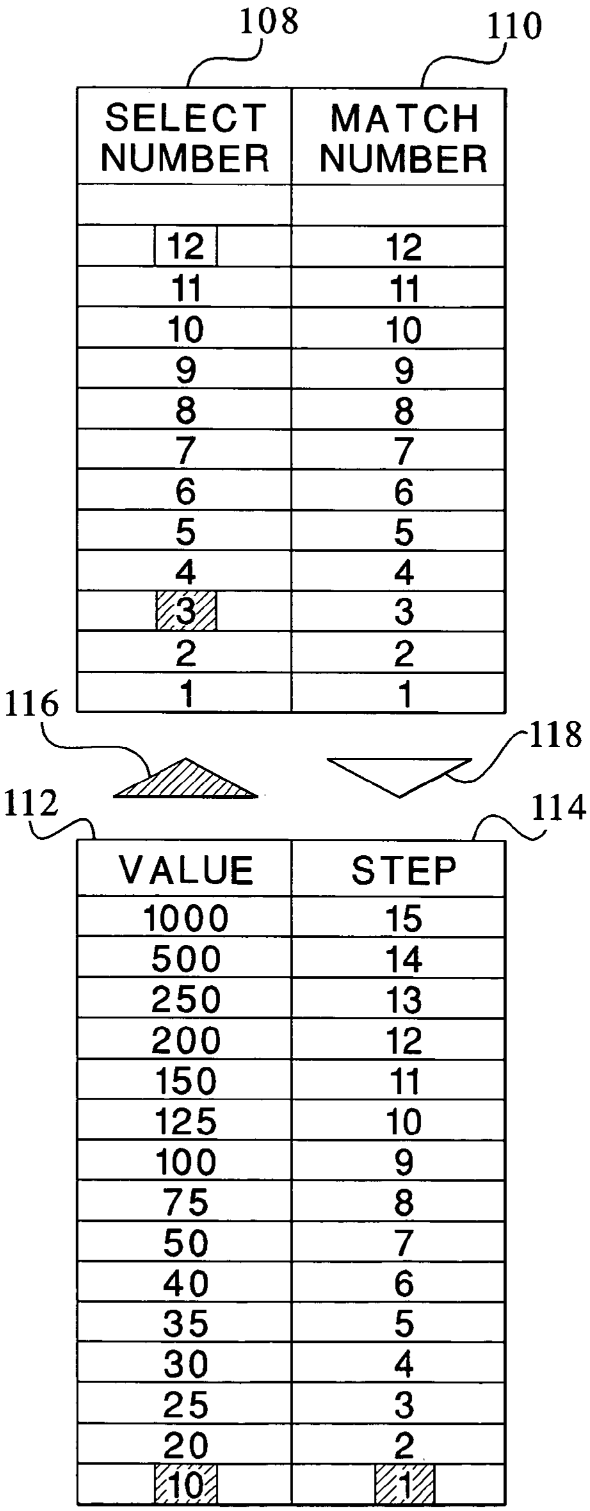

An alternative embodiment of the game is illustrated in FIGS. 5A through 5C. This embodiment includes preferably four display areas provided by display 32. The display areas (which appear as ladders or tables) include a first or select number display 108, a second or match number display 110, a value, score or current total display 112 and a step display 114. Two select buttons or arrows are also provided, up and down arrows 116 and 118 respectively, which the player uses to predict whether the match number is higher or lower as illustrated in FIG. 5A.

It should be appreciated that in this embodiment, the player earns a set value for each play, ranging from 10 to 1000 award, credit or bonus values displayed in value display 112. Each value has a corresponding step, ranging from 1 to 15, displayed in step display 114, where step 1 corresponds to 10 credit or bonus values and step 15 corresponds to 1000 credit or bonus values. In this embodiment, the player has a total of 15 plays per bonus round, where each successive play or step is worth more credit points or bonus values than the previous play or step.

The game selects and displays a number (i.e., the select number) in the select number display 108 as illustrated in FIG. 5A. Again, the game preferably first uses numbers 1 through 12. Select number display 108 highlights or displays all of the first numbers for both the current and previous plays, reminding the player which numbers have been used previously.

Gaming device 10 displays or exhibits the number 12 as the first or select number in the select number display 108 as illustrated in FIG. 5A. The gaming device 10 determines the second number and the player determines that the second number is higher or lower than the first number. Here, the player selects the lower select button or down arrow 118 which is highlighted by the display 32.

Display 32 displays the second number (i.e., 3) in the match number display 110 as illustrated in FIG. 5B. Since 3 is lower or less than 12, the gaming device 10 determines that the player made the correct selection and awards points, credits or bonus values to the player. In this embodiment, the gaming device 10 highlights the first step and the corresponding value (i.e., 10) in the step and value displays 114 and 112 respectively. This process or game continues until the bonus round is terminated.

The select number (i.e., 3) for the previous play becomes the new match number for the next play as discussed previously. However, in this embodiment the match numbers are only used once. Display 32 highlights the new first number (i.e., 3) but continues to display the number 12 (i.e., the first number from the previous play) as illustrated in FIG. 5C. This enables the player to remember what numbers have been played. The bonus round continues until the player guesses wrong as discussed previously.

Figure 6:
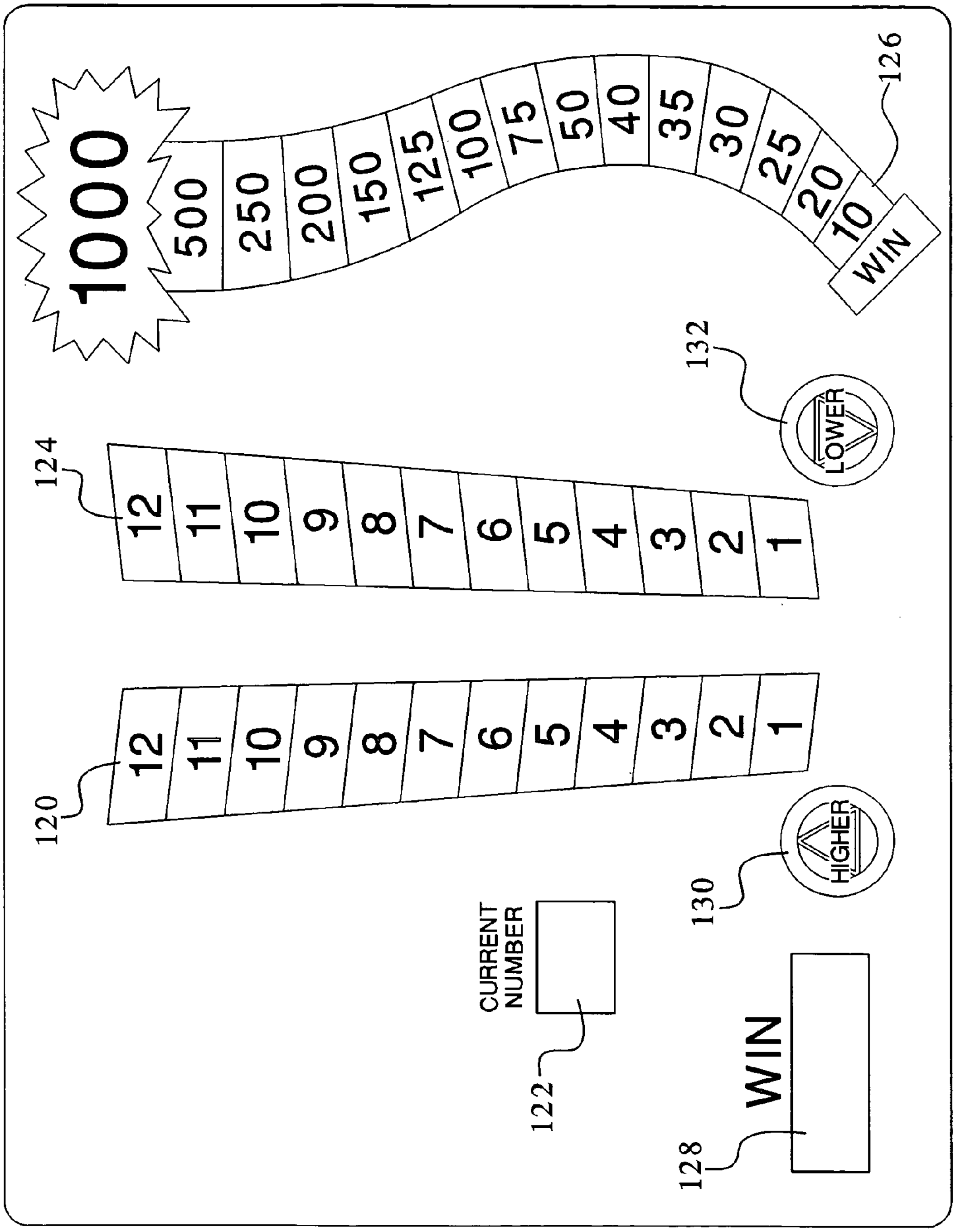
FIG. 6 is a top plan view of number, higher and lower arrows and scoring displays illustrating another alternative embodiment of the gaming scheme of the present invention.

Yet another alternative embodiment of the game is illustrated in FIG. 6. This embodiment preferably consists of five display areas provided by display 32. The display areas include a first or select number display 120, a current number display 122 (which displays a value corresponding to the number in the select number display 120), a second or match number display 124, a value, score or current total display 126 and a win display 128. Two select buttons or arrows are also provided, up and down arrows 130 and 132 respectively, whereby the player selects whether the match number is higher or lower than the select number as discussed previously for the other embodiments. This also illustrates the awards 10 to 1000 associated with each correct successive player prediction.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device operable under control of a processor, said gaming device comprising:
- an input device;
- a display device; and
- a memory device which stores a plurality of instructions, which when executed by said processor, cause said processor to operate with said display device and said input device, for each play of a game, to:
- (a) display a plurality of symbols;
- (b) select one of said symbols;
- (c) indicate said selected symbol;
- (d) form and display at least two selection sets, each selection set including zero, one or a plurality of the symbols which are not selected, said non-selected symbols each being associated with a static probability of being randomly selected as a match symbol;
- (e) enable a player to input a pick of one of the selection sets;
- (f) randomly select one of said non-selected symbols as the match symbol, said non-selected symbol being randomly selected based on the static probability associated with said non-selected symbol;
- (g) if the player's picked selection set includes the match symbol, provide the player an award; and
- (h) repeat (b) to (g) at least once, wherein each of said symbols may be randomly selected as a match symbol more than once and (b) to (g) are repeated at least once regardless of if the player's picked selection set includes the match symbol.

2. The gaming device of claim 1, wherein the selection set picked by the player includes more than one non-selected symbol.

3. The gaming device of claim 1, wherein the award provided to the player is based on the number of selection sets correctly picked by the player.

4. The gaming device of claim 1, wherein when executed by the processor, the plurality of instructions cause the processor to operate to terminate the play of the game if the player's picked selection set does not include the match symbol.

5. A gaming device comprising:
- a display device;
- an input device;
- a processor; and
- a memory device which stores a plurality of instructions, which when executed by the processor, cause the processor to operate with the display device and the input device to, for each play of a primary wagering game, in response to an occurrence of a triggering event in the primary wagering game:

(a) select one of a plurality of symbols;

(b) display said selected symbol to a player;

(c) form at least two selection sets from the symbols, each selection set including zero, one or a plurality of the symbols which are not selected, said non-selected symbols each being associated with a static probability of being randomly selected as a match symbol;

(d) enable the player to input a pick of one of the selection sets with at least one non-selected symbol;

(e) randomly select one of said non-selected symbols, said non-selected symbol being randomly selected based on the static probability associated with said non-selected symbol, said randomly selected symbol being designated as the match symbol;

(f) if the player's picked selection set includes said designated match symbol, provide an award to the player; and (g) repeat (a) to (f) at least once, wherein each of said symbols may be randomly selected as a match symbol more than once and (a) to (f) are repeated at least once regardless of if the player's picked selection set includes said designated match symbol.

6. The gaming device of claim 5, wherein the award provided to the player is based on the number of selection sets picked by the player which include match symbols.

7. The gaming device of claim 5, wherein when executed by the processor, the plurality of instructions cause the processor to operate to terminate the play of the primary game if the player's picked selection set does not include the designated match symbol.

8. A gaming device operable under control of a processor, said gaming device comprising:

an input device;

a display device; and a memory device which stores a plurality of instructions, which when executed by the processor, cause the processor to operate with said display device and said input device to control each play of a game by:

(a) forming and displaying at least two selection sets, each selection set including zero, one or a plurality of symbols, and each symbol in each selection set being associated with a static probability of being randomly selected;

(b) enabling a player to input a pick of one of said selection sets;

(c) randomly selecting one of said symbols, said symbol being randomly selected based on the static probability associated with said symbol;

(d) displaying said selected symbol;

(e) providing the player an award if the player correctly picked the selection set which includes the randomly selected symbol; and (f) reforming said selection sets from said plurality of symbols for at least one subsequent pick of one of the reformed selection sets by the player, said at least one subsequent pick occurring regardless of if the player correctly picked the selection set which includes the randomly selected symbol, said reformed selection sets being reformed based on said randomly selected symbol, the reformed selection sets each including zero, one or a plurality of said symbols and each of said symbols may be randomly selected more than once.

9. The gaming device of claim 8, wherein when executed by the processor, the plurality of instructions cause the processor to operate to terminate the play of the game if the player's picked selection set does not include the randomly selected symbol.

10. A gaming device operable under control of a processor, said gaming device comprising:

an input device;

a display device; and a memory device which stores a plurality of instructions, which when executed by the processor, cause the processor to operate with said display device and said input device to control each play of a game by:

(a) forming and displaying at least two selection sets, each selection set including zero, one or a plurality of said symbols, and each symbol in each selection set being associated with a static probability of being randomly selected;

(b) enabling a player to input a pick of one of said selection sets after the selection sets are displayed;

(c) randomly selecting one of said symbols, said symbol being randomly selected based on said static probability associated with said symbol;

(d) if the player picked selection set includes said randomly selected symbol, repeating (a) to (d) at least once, wherein each of said symbols my be randomly selected more than once; and (e) providing the player an award based on the number of player picked selection sets which include randomly selected symbols.

11. The gaming device of claim 8, wherein said reformed selection sets are reformed based on the randomly selected symbol.

12. The gaming device of claim 10, wherein when executed by the processor, the plurality of instructions cause the processor to operate to terminate the play of the game if the player's picked selection set does not include the randomly selected symbol.

13. A method of operating a gaming device including a memory device which stores a plurality of instructions, for each play of a game, said method comprising:

(a) causing a display device to display a plurality of symbols;

(b) causing a processor to execute the plurality of instructions to determine at least two symbol selection sets from the plurality of symbols, each symbol selection set including zero, one or a plurality of said symbols, and each of the symbols in each selection set being associated with a static probability of being randomly selected;

(c) enabling a player to input a pick of one of said symbol selection sets;

(d) causing the processor to execute the plurality of instructions to randomly select one of the symbols, said symbol being randomly selected based on said static probability associated with said symbol;

(e) providing the player an award if the player's picked symbol selection set includes said randomly selected symbol; and (f) repeating steps (b) through (e) until the player does not pick the symbol selection set which includes the randomly selected symbol or until a designated number of picks are made by the player wherein each of said symbols may be randomly selected more than once and (b) to (e) are repeated at least once regardless of if the player's picked selection set includes said randomly selected symbol.

14. The method of claim 13, wherein a symbol selection set determined after a first symbol selection is determined based on a previous randomly selected symbol.

15. The method of claim 13, wherein the player is prohibited from picking a selection set having zero symbols.

16. The method of claim 13, wherein the award provided to the player is based on the number of player picked symbol selection sets which include said randomly selected symbols.

17. The method of claim 13, which is provided through a data network.

18. The method of claim 17, wherein the data network is an internet.

19. The method of claim 13, which includes causing the processor to execute the plurality of instructions to terminate the play of the game if the player's picked symbol set does not include said randomly selected symbol.

20. A method of operating a gaming device including a memory device which stores a plurality of instructions, for each play of a game, said method comprising:

(a) causing a display device to display a plurality of symbols;

(b) causing a processor to execute the plurality of instructions to select one of said symbols;

(c) causing the processor to execute the plurality of instructions to indicate said selected symbol;

(d) causing the processor to execute the plurality of instructions to form at least two selection sets, each selection set including zero, one or a plurality of the symbols which are not selected, said non-selected symbols each being associated with a static probability of being randomly selected as a match symbol;

(e) causing the display device to display the formed at least two selections sets;

(f) enabling a player to input a pick of one of the selection sets;

(g) causing the processor to execute the plurality of instructions to randomly select one of said non-selected symbols, said non-selected symbol being randomly selected based on the static probability associated with said non-selected symbol, said randomly selected symbol being designated as the match symbol;

(h) if the player's picked selection set includes the match symbol, providing the player an award; and (i) repeating (b) to (h) at least once, wherein each of said symbols may be randomly selected as a match symbol more than once and (b) to (h) are repeated at least once regardless of if the player's picked selection set includes the match symbol.

21. The method of claim 20, wherein the selection set picked by the player includes more than one non-selected symbol.

22. The method of claim 20, wherein the award provided to the player is based on the number of selection sets correctly picked by the player.

23. The method of claim 20, which is provided through a data network.

24. The method of claim 23, wherein the data network is an internet.

25. A method of operating a gaming device including a memory device which stores a plurality of instructions, for each play of a game, said method comprising:

(a) causing a processor to execute the plurality of instructions to select one of a plurality of symbols;

(b) causing a display device to display the selected symbol to a player;

(c) causing the processor to execute the plurality of instructions to form at least two selection sets from the symbols, each selection set including zero, one or a plurality of the symbols which are not selected, said non-selected symbols each being associated with a static probability of being randomly selected as a match symbol;

(d) enabling the player to input a pick of one of the selection sets with at least one non-selected symbol;

(e) causing the processor to execute the plurality of instructions to randomly select one of said non-selected symbols, said non-selected symbol being randomly selected based on the static probability associated said non-selected symbol, said randomly selected symbol being designated as the match symbol;

(f) if the player's picked selection set includes said designated match symbol, providing an award to the player; and (g) repeat steps (a) to (f) at least once if the player's picked selection set includes said designated match symbol, wherein each of said symbols may be randomly selected as a match symbol more than once.

26. The method of claim 25, wherein the award provided to the player is based on the number of selection sets picked by the player which include match symbols.

27. The method of claim 25, which is provided through a data network.

28. The method of claim 27, wherein the data network is an internet.

29. The method of claim 20, which includes causing the processor to execute the plurality of instructions to terminate the play of the game if the player's picked symbol set does not include said match symbol.

30. A method of operating a gaming device including a memory device which stores a plurality of instructions, for each play of a game, said method comprising:

(a) causing a processor to execute the plurality of instructions to form at least two selection sets, each selection set including zero, one or a plurality of symbols, and each symbol in each selection set being associated with a static probability of being randomly selected;

(b) causing a display device to display the formed at least two selections sets;

(c) enabling a player to input a pick of one of said selection sets;

(d) causing the processor to execute the plurality of instructions to randomly select one of said symbols, said symbol being randomly selected based on the static probability associated with said symbol;

(e) causing the display device to display the randomly selected symbol;

(f) providing the player an award if the player correctly picked the selection set which includes the randomly selected symbol; and (g) causing the processor to execute the plurality of instructions to reform said selection sets from said plurality of symbols for at least one subsequent pick of one of the reformed selection sets by the player, said at least one subsequent pick of one of the reformed selection sets occurring regardless of if the player correctly picked the selection set which includes the randomly selected symbol, said reformed selection sets being reformed based on said randomly selected symbol, said reformed selection sets each including zero, one or a plurality of said symbols and each of said symbols may be randomly selected more than once.

31. The method of claim 30, which is provided through a data network.

32. The method of claim 31, wherein the data network is an internet.

33. The method of claim 25, which includes causing the processor to execute the plurality of instructions to terminate the play of the game if the player's picked symbol set does not include said designated match symbol.

34. A method of operating a gaming device including a memory device which stores a plurality of instructions, for each play of a game, said method comprising:

(a) causing a processor to execute the plurality of instructions to form at least two selection sets, each selection set including zero, one or a plurality of symbols, and each symbol in each selection set being associated with a static probability of being randomly selected;

(b) causing a display device to display the formed at least two selection sets;

(c) enabling a player to input a pick of one of said selection sets after the selection sets are displayed;

(d) causing the processor to execute the plurality of instructions to randomly select one of said symbols, said symbol being randomly selected based on said static probability associated with said symbol;

(e) if the player picked selection set includes said randomly selected symbol, repeating (a) to (e) at least once; and (f) providing the player an award based on the number of player picked selection sets which include randomly selected symbols.

35. The method of claim 34, wherein said formed at least two selection sets are reformed based on the randomly selected symbol.

36. The method of claim 34, which is provided through a data network.

37. The method of claim 36, wherein the data network is an internet.

38. The method of claim 30, which includes causing the processor to execute the plurality of instructions to terminate the play of the game if the player's picked symbol set does not include said randomly selected symbol.

39. The method of claim 34, which includes causing the processor to execute the plurality of instructions to terminate the play of the game if the player's picked symbol set does not include said randomly selected symbol.

40. A gaming device operable under control of a processor, said gaming device comprising:

an input device; and a display device; and a memory device which stores a plurality of instructions, which when executed by the processor, cause the processor to operate with the display device and the input device to control each play of a game by:

(a) displaying a plurality of symbols;

(b) forming and displaying at least two selection sets, each selection set including zero, one or a plurality of the symbols and each of the symbols in each of the selections sets being associated with a static probability of being randomly selected;

(c) enabling a player to input a pick one of the selection sets;

(d) randomly selecting one of the symbols, said symbol being randomly selected based on the static probability associated with the symbol;

(e) providing the player an award if the player's picked symbol selection set includes said randomly selected symbol; and (f) repeating (b) to (e) until the player does not pick the symbol selection set which includes said randomly selected symbol or until a designated number of picks are inputted by the player, wherein each of the symbols may be randomly selected more than once and (b) to (e) are repeated at least once regardless of if the player's picked selection set includes said randomly selected symbol.

41. The gaming device of claim 40, wherein when executed by the processor, the plurality of instructions cause the processor to operate to terminate the play of the game if the player's picked selection set does not include the randomly selected symbol.

* * * * *